US011314159B2

(12) United States Patent
Shopp

(10) Patent No.: US 11,314,159 B2
(45) Date of Patent: Apr. 26, 2022

(54) PROJECTION SCREEN SYSTEM AND METHOD FOR MOUNTING THE SAME

(71) Applicant: Draper, Inc., Spiceland, IN (US)

(72) Inventor: Rick A. Shopp, New Castle, IN (US)

(73) Assignee: Draper, Inc., Spiceland, IN (US)

( * ) Notice: Subject to any disclaimer, the term of this patent is extended or adjusted under 35 U.S.C. 154(b) by 1 day.

(21) Appl. No.: 16/900,851

(22) Filed: Jun. 12, 2020

(65) Prior Publication Data
US 2021/0382384 A1  Dec. 9, 2021

Related U.S. Application Data

(60) Provisional application No. 63/036,000, filed on Jun. 8, 2020.

(51) Int. Cl.
| *G03B 21/58* | (2014.01) |
| *F16M 11/04* | (2006.01) |
| *G03B 21/60* | (2014.01) |
| *G03B 21/625* | (2014.01) |
| *G03B 21/62* | (2014.01) |
| *G03B 21/56* | (2006.01) |
| *F16M 13/02* | (2006.01) |

(52) U.S. Cl.
CPC ........... *G03B 21/58* (2013.01); *F16M 11/046* (2013.01); *G03B 21/56* (2013.01); *G03B 21/60* (2013.01); *G03B 21/62* (2013.01); *G03B 21/625* (2013.01); *F16M 13/027* (2013.01)

(58) Field of Classification Search
CPC ........ G03B 21/58; G03B 21/56; G03B 21/60; G03B 21/625; G03B 21/62; F16M 11/046; F16M 13/027

USPC ....................................... 359/443; 248/475.1
See application file for complete search history.

(56) References Cited

U.S. PATENT DOCUMENTS

| 1,141,067 | A | * | 5/1915 | Lloyd | ........................ | F16L 9/18 138/111 |
| 2,516,020 | A | * | 7/1950 | Reed | ..................... | B21C 37/151 29/897 |
| 2,821,883 | A | * | 2/1958 | Rusch | ..................... | G03B 21/58 359/461 |
| 3,900,063 | A | * | 8/1975 | Roller | ........................ | E06B 9/17 160/310 |
| 4,159,162 | A | * | 6/1979 | Christoffel | ............. | G03B 21/58 160/24 |
| 5,140,461 | A | * | 8/1992 | Blood | ..................... | G03B 21/58 359/461 |
| 5,274,499 | A | * | 12/1993 | Shopp | ..................... | G03B 21/58 359/461 |

(Continued)

OTHER PUBLICATIONS

Elite Screens, Electric Wall/Ceiling Projection Screen Saker Tab-Tension Screen User Guide, www.elitescreens.com, 22, Mar. 2004, 6 pages (Year: 2004).*

(Continued)

*Primary Examiner* — Clayton E. LaBalle
*Assistant Examiner* — Kevin C Butler
(74) *Attorney, Agent, or Firm* — Faegre Drinker Biddle & Reath LLP

(57) ABSTRACT

A support system for moving a rollable material between a stored configuration and an unrolled configuration. The rollable material may be a projection screen, and the unrolled configuration may be a viewing configuration.

22 Claims, 12 Drawing Sheets

(56) References Cited

U.S. PATENT DOCUMENTS

| | | | | |
|---|---|---|---|---|
| 5,341,241 A * | 8/1994 | Shopp | E06B 9/17007 | 359/443 |
| 5,351,736 A * | 10/1994 | Laffler | E04F 10/0633 | 160/66 |
| 5,353,152 A * | 10/1994 | Realmuto | G03B 21/58 | 160/120 |
| 6,111,694 A * | 8/2000 | Shopp | G03B 21/58 | 160/23.1 |
| 6,615,896 B1 * | 9/2003 | Andalia | E05D 15/242 | 160/183 |
| 6,876,493 B1 * | 4/2005 | Lin | E06B 9/40 | 160/23.1 |
| 6,880,607 B2 * | 4/2005 | Marocco | E06B 9/323 | 160/173 R |
| 6,892,992 B2 * | 5/2005 | Donahue | B62J 17/04 | 211/18 |
| 6,923,413 B2 * | 8/2005 | Dozier | F16M 11/10 | 248/225.21 |
| 7,134,473 B2 * | 11/2006 | Lukos | E06B 9/50 | 160/242 |
| 7,397,603 B2 * | 7/2008 | Peterson | G03B 21/10 | 160/354 |
| 7,510,111 B2 * | 3/2009 | Mikkelsen | G03B 21/58 | 235/375 |
| 7,515,338 B2 * | 4/2009 | Canon | E06B 9/80 | 160/310 |
| 7,770,625 B2 * | 8/2010 | Lukos | G03B 21/58 | 160/242 |
| 7,777,948 B2 * | 8/2010 | Chung | G03B 21/56 | 359/450 |
| 7,823,620 B2 * | 11/2010 | Kirby | E06B 9/50 | 160/323.1 |
| 7,995,273 B1 * | 8/2011 | Robinson | G03B 21/56 | 359/449 |
| 8,107,166 B2 * | 1/2012 | Tsai Chen | G03B 21/56 | 359/461 |
| 8,169,698 B1 * | 5/2012 | Robinson | G03B 21/56 | 359/449 |
| 8,220,520 B2 * | 7/2012 | Lukos | E04F 10/0662 | 160/242 |
| 8,299,734 B2 * | 10/2012 | Mullet | E06B 9/62 | 318/255 |
| 8,368,328 B2 * | 2/2013 | Mullet | E06B 9/72 | 318/255 |
| 8,559,104 B2 * | 10/2013 | Hendricks | G03B 21/58 | 359/461 |
| 8,575,872 B2 * | 11/2013 | Mullet | E06B 9/60 | 318/255 |
| 8,631,851 B2 * | 1/2014 | Migues | E04F 10/0666 | 160/67 |
| 8,659,246 B2 * | 2/2014 | Mullet | E06B 9/42 | 318/255 |
| 9,018,868 B2 * | 4/2015 | Lucas | G08C 17/02 | 318/255 |
| 9,152,032 B2 * | 10/2015 | Mullet | E06B 9/42 | |
| 9,194,179 B2 * | 11/2015 | Mullet | E06B 9/68 | |
| 9,249,623 B2 * | 2/2016 | Mullet | E06B 9/50 | |
| 9,329,468 B2 * | 5/2016 | Miggiano | G03B 21/58 | |
| 9,371,688 B2 * | 6/2016 | Cavarec | E06B 9/64 | |
| 10,684,542 B2 * | 6/2020 | Enochs | G03B 21/58 | |
| 2005/0082452 A1 * | 4/2005 | Kirby | E06B 9/50 | 248/266 |
| 2008/0043157 A1 * | 2/2008 | Jones | G03B 21/58 | 348/744 |
| 2008/0141599 A1 * | 6/2008 | Akdag | E06B 9/08 | 52/202 |
| 2011/0108204 A1 * | 5/2011 | Vogias | E04F 10/02 | 160/37 |
| 2013/0235455 A1 * | 9/2013 | Qingjun | G03B 21/58 | 359/461 |
| 2015/0136338 A1 * | 5/2015 | Lemaitre | H02K 11/33 | 160/310 |
| 2015/0277220 A1 * | 10/2015 | Durkee | G03B 21/58 | 359/461 |
| 2016/0090779 A1 * | 3/2016 | Nurre | E06B 9/42 | 160/266 |
| 2016/0258213 A1 * | 9/2016 | Cavarec | E06B 9/68 | |
| 2016/0290043 A1 * | 10/2016 | McPherson, Jr. | E06B 9/78 | |
| 2017/0074622 A1 * | 3/2017 | Wallace | E06B 9/08 | |
| 2017/0130526 A1 * | 5/2017 | Gasparrini | E06B 9/40 | |
| 2020/0185965 A1 * | 6/2020 | Poirier | H02J 50/27 | |

OTHER PUBLICATIONS

Draper, Inc., Floating Mounting Bracket, Draper, Spiceland, Indiana, 2015, 4 pages (Year: 2015).*

Installation Instructions—Floating Mounting Bracket for Targa, Premier, Premier/C and Luma 2 Projection Screens by Draper; Draper, Inc ; available at least Feb. 2015; 2 pages.

* cited by examiner

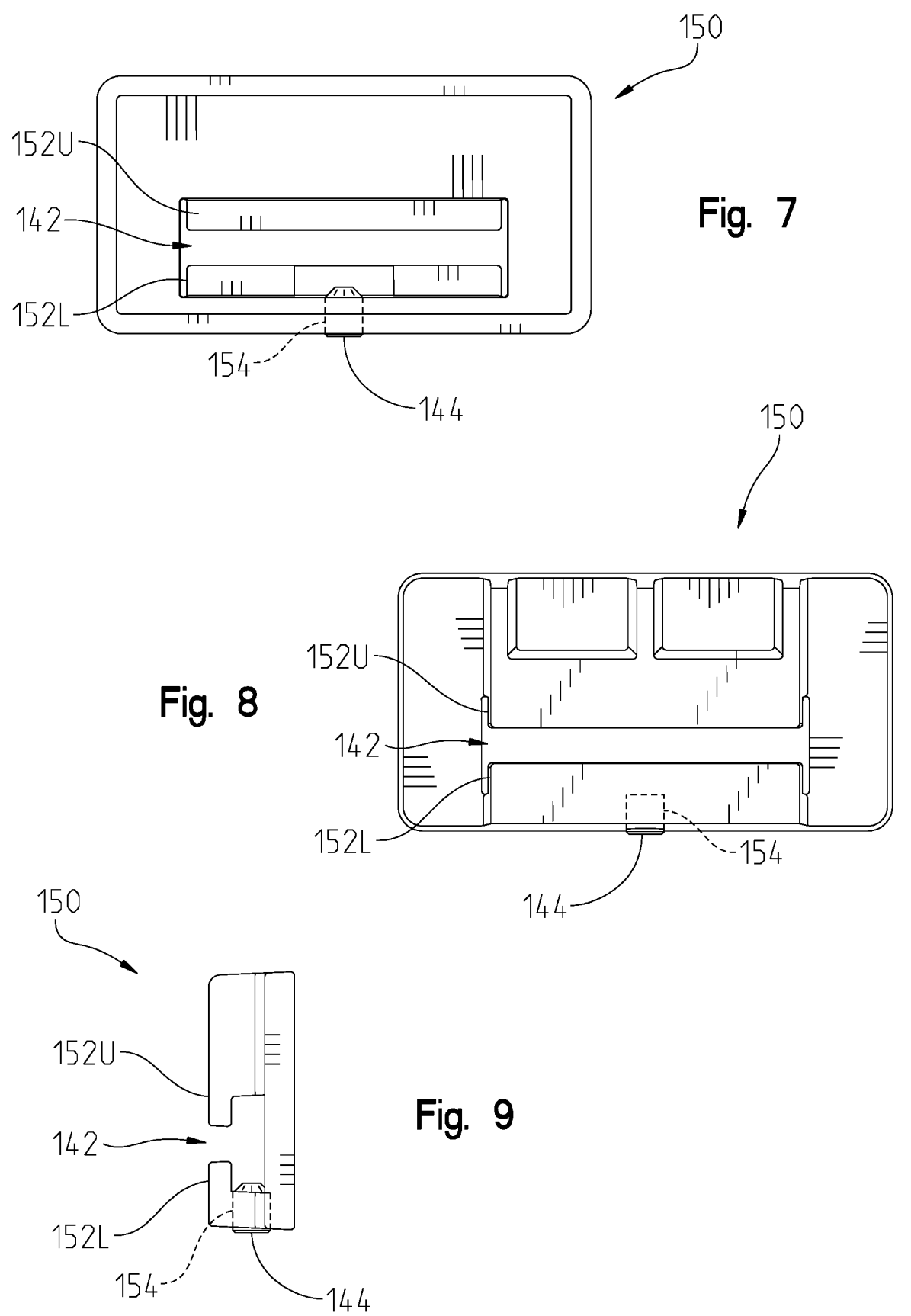

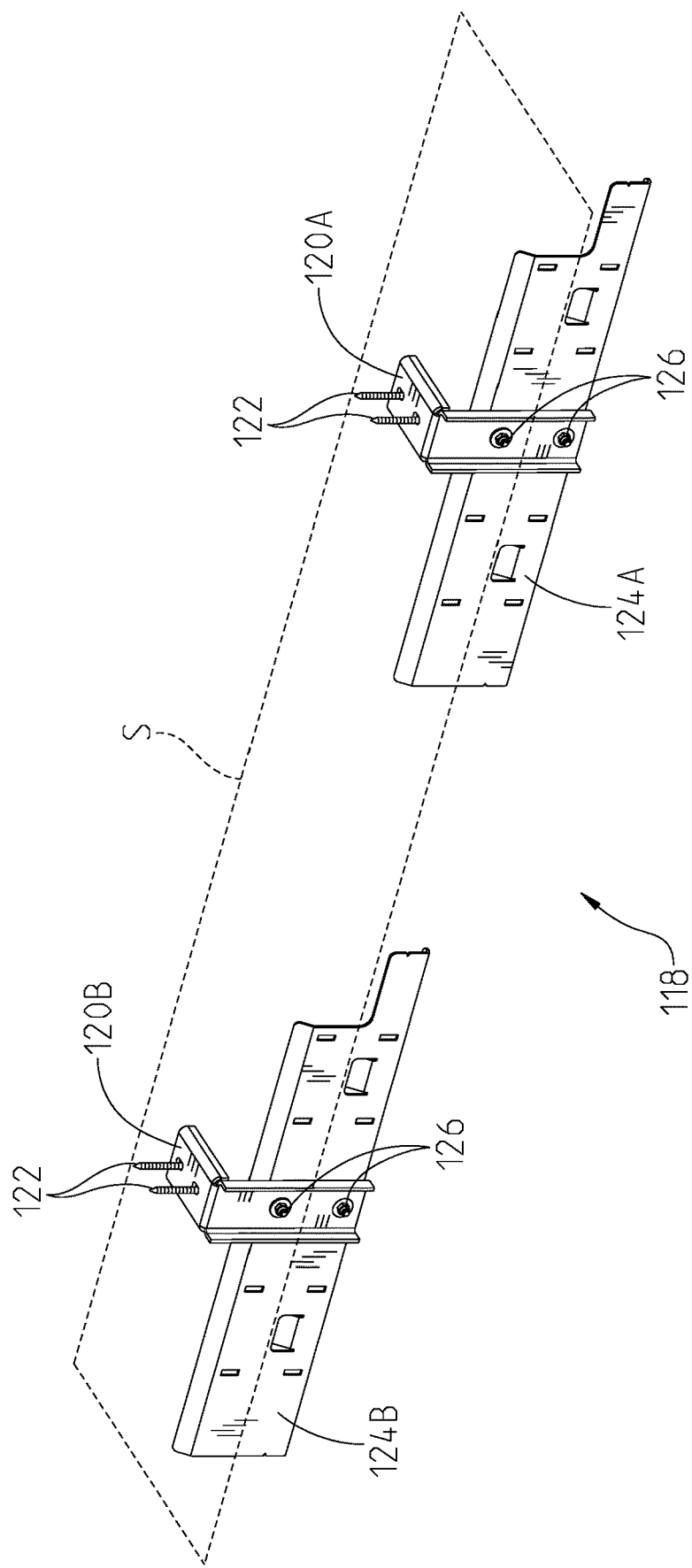

PROJECTION SCREEN SYSTEM AND METHOD FOR MOUNTING THE SAME

CROSS-REFERENCE TO RELATED APPLICATION

The present application claims the benefit of U.S. Provisional Patent Application No. 63/036,000, entitled PROJECTION SCREEN SYSTEM AND METHOD FOR MOUNTING THE SAME, filed Jun. 8, 2020, the disclosure of which is incorporated by reference in its entirety for all purposes.

TECHNICAL FIELD OF THE DISCLOSURE

The present disclosure relates to a projection screen system and, more particularly, a projection screen system that facilitates ease of mounting and securing the system to an environmental support structure.

BACKGROUND OF THE DISCLOSURE

Projection screen systems are often mounted to environmental support structures, such as ceilings and walls of buildings. However, would be desirable to provide a projection screen system that facilitates ease of mounting the system to an environmental support structure.

SUMMARY

According to an exemplary embodiment of the present disclosure, a support system for a rollable material is provided. The rollable material is moveable between a rolled configuration and an unrolled configuration. The support system includes a mount adapted to be supported by an environmental support structure. The support system further includes a housing adapted to be supported by the mount. The housing is adapted to support the rollable material and includes a dispensing passage through which the rollable material is extendable in the unrolled configuration. The support system further includes a blocker that is adapted to be carried by the housing. The blocker is adapted to be moved relative to the housing from a disengagement position to an engagement position. In the disengagement position the blocker is adapted to permit detachment of the housing from the mount, and in the engagement position the blocker is adapted to inhibit detachment of the housing from the mount.

In certain embodiments, in the disengagement position the blocker is adapted to be disposed a first distance from the mount, in the engagement position the blocker is adapted to be disposed a second distance from the mount, and the second distance is less than the first distance.

In certain embodiments, the housing includes a coupler, and the blocker includes an interface that is adapted to couple to the coupler.

In certain embodiments, the coupler includes a guide and the blocker is slidably carried by the guide.

In certain embodiments, the blocker is a first blocker, the disengagement position is a first disengagement position, the engagement position is a first engagement position, and support system further includes a second blocker that is adapted to be carried by the housing. The second blocker is adapted to be moved relative to the housing from a second disengagement position to a second engagement position. In the second disengagement position the second blocker is adapted to permit detachment of the housing from the mount, and in the second engagement position the second blocker is adapted to inhibit detachment of the housing from the mount.

In certain embodiments, the mount includes a first mount portion that is adapted to be supported by the environmental support structure and a second mount portion that is adapted to be supported by the environmental support structure. When the first blocker is disposed in the first disengagement position and the second blocker is disposed in the second disengagement position, detachment of the housing from the mount is permitted. When at least one of the first blocker is disposed in the first engagement position and the second blocker is disposed in the second engagement position, detachment of the housing from the mount is inhibited.

In certain embodiments, the housing includes a guide that is adapted to slidably carry the first blocker and the second blocker.

In certain embodiments, the support system further includes a securement element that is adapted to secure the blocker to the housing.

In certain embodiments, the securement element is a fastener.

In certain embodiments, the housing includes a rail and the blocker includes a slot that is adapted to receive the rail and thereby slidably couple the blocker to the housing.

In certain embodiments, the rollable material is a projection screen.

According to another exemplary embodiment of the present disclosure, a support system for a rollable material is provided. The rollable material is moveable between a rolled configuration and an unrolled configuration. The support system includes a mount that is adapted to be supported an environmental support structure. The support system further includes a housing that is adapted to support the rollable material. The housing includes a first housing portion that is adapted to be supported by the mount and a second housing portion that is adapted to be supported by the first housing portion. The second housing portion and the first housing portion are adapted to together define a dispensing passage through which the rollable material is extendable in the unrolled configuration. The second housing portion is adapted to be moved relative to the first housing portion to provide access to the rollable material. The support system further includes a slider that is adapted to be carried by the housing. The slider is adapted to be slid relative to the housing from a disengagement position to an engagement position. In the disengagement position the slider is adapted to permit detachment of the housing from the mount, and in the engagement position the slider is adapted to inhibit detachment of the housing from the mount.

In certain embodiments, in the disengagement position the slider is adapted to be disposed a first distance from the mount, in the engagement position the slider is adapted to be disposed a second distance from the mount, and the second distance is less than the first distance.

In certain embodiments, the slider is a first slider, the disengagement position is a first disengagement position, the engagement position is a first engagement position, and the support system further includes a second slider that is adapted to be carried by the housing. The second slider is adapted to be slid relative to the housing from a second disengagement position to a second engagement position. In the second disengagement position the second slider is adapted to permit detachment of the housing from the mount, and in the second engagement position the second slider is adapted to inhibit detachment of the housing from the mount.

According to yet another exemplary embodiment of the present disclosure, a method for mounting a support system to an environmental support structure via a mount is provided. The method includes the steps of: positioning a housing of the support system adjacent the mount, the housing carrying a blocker movable from a disengagement position to an engagement position; coupling the housing to the mount while the blocker is in the disengagement position; moving the blocker from the disengagement position to the engagement position, the blocker thereby inhibiting detachment of the housing from the mount.

In certain embodiments, the method further includes securing the blocker to the housing in the engagement position.

In certain embodiments, in the disengagement position the blocker is disposed a first distance from the mount, in the engagement position the blocker is disposed a second distance from the mount, and the second distance is less than the first distance.

In certain embodiments, moving the blocker from the disengagement position to the engagement position includes sliding the blocker relative to the housing from the disengagement position to the engagement position.

In certain embodiments, sliding the blocker from the disengagement position to the engagement position includes sliding the blocker in a sliding direction substantially parallel to a longitudinal axis of the housing.

In certain embodiments, coupling the housing to the mount includes moving the housing relative to the mount in an attachment direction substantially perpendicular to the longitudinal axis.

In certain embodiments, the blocker is a first blocker, the first disengagement position is a first disengagement position, the engagement position is a first engagement position, and the housing carries a second blocker that is movable from a second disengagement position to a second engagement position, and the method further includes coupling the housing to the mount while the second blocker is in the second disengagement position; and moving the second blocker from the second disengagement position to the second engagement position, the second blocker thereby inhibiting detachment of the housing from the mount.

In certain embodiments, the mount includes a first mount portion and a second mount portion, and moving the first blocker from the first disengagement position to the first engagement position includes moving the first blocker adjacent the first mount portion such that the first blocker inhibits detachment of the housing from the first mount portion, and moving the second blocker from the second disengagement position to the second engagement position includes moving the second blocker adjacent the second mount portion such that the second blocker inhibits detachment of the housing from the second mount portion.

In certain embodiments, the housing includes a guide slidably carrying the first blocker and the second blocker, and moving the first blocker from the first disengagement position to the first engagement position includes sliding the first blocker along the guide, and moving the second blocker from the second disengagement position to the second engagement position includes sliding the second blocker along the guide.

In certain embodiments, sliding the first blocker from the first disengagement position to the first engagement position includes sliding the first blocker along the guide in a first sliding direction substantially parallel to a longitudinal axis of the housing, and sliding the second blocker from the second disengagement position to the second engagement position includes sliding the second blocker along the guide in a second sliding direction substantially parallel to the longitudinal axis and opposite the first sliding direction.

Additional features and advantages will become apparent to those skilled in the art upon consideration of the following detailed description.

BRIEF DESCRIPTION OF THE DRAWINGS

Advantages and features of the embodiments of this disclosure will become more apparent from the following detailed description of exemplary embodiments when viewed in conjunction with the accompanying drawings, wherein:

FIG. 7 illustrates a rear view of the blocker of FIG. 5;

FIG. 8 illustrates a front view of the blocker of FIG. 5;

FIG. 9 illustrates a side view of the blocker of FIG. 5;

FIG. 10 illustrates a rear perspective view of a mount of the support system of FIG. 1 being mounted on a ceiling, where the ceiling is illustrated with phantom lines;

Figure 1:
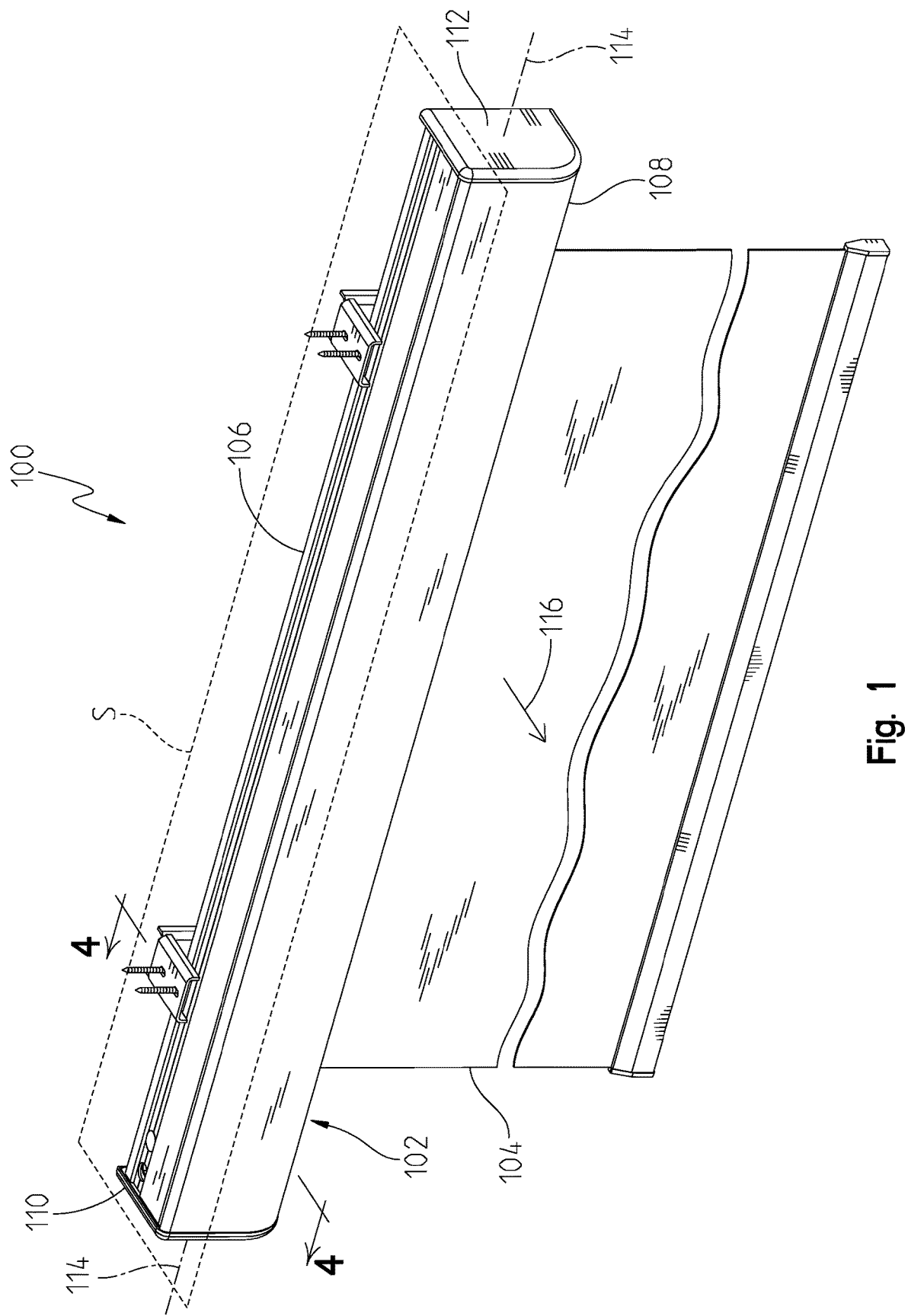
FIG. 1 illustrates a front perspective view of an embodiment of a support system of the present disclosure, where a rollable material is in an unrolled configuration.

Corresponding reference characters indicate corresponding parts throughout the several views. Although the drawings represent an embodiment of the present disclosure, the drawings are not necessarily to scale and certain features may be exaggerated in order to better illustrate and explain the present disclosure. The exemplifications set out herein illustrate embodiments of the disclosure, in one form, and such exemplifications are not to be construed as limiting the scope of the disclosure in any manner.

DETAILED DESCRIPTION OF THE DRAWINGS

FIG. 1 illustrates an embodiment of a support system 100 according to the present disclosure. Support system 100 may be mounted to an environmental support structure S, such as, for example, a ceiling (as illustrated in FIG. 1) or a wall (not shown). Support system 100 includes a housing 102 that carries a rollable material 104, and rollable material 104 is moveable between an unrolled configuration (as illustrated in FIG. 1) and a rolled configuration (shown elsewhere). Rollable material 104 extends through a dispensing passage (shown elsewhere) of housing 102 in the unrolled configuration, and rollable material 104 is stored within housing 102 in the rolled configuration.

In some embodiments and as illustrated, rollable material 104 is a projection screen. In various embodiments, the projection screen may include a woven fiberglass backing with a vinyl reflective surface laminated to the fiberglass (gain of approximately 1.0), microscopic glass beads provided on the viewing surface (gain from about 0.5 to about 2.5 depending on the viewing angle), and/or a white (gain of about 1.0 or from about 0.4 to about 2.2 depending on the viewing angle) or light gray (gain of about 0.6 to 0.9 depending on the viewing angle) vinyl material without a backing. Other suitable projection screens known to those of ordinary skill in the art may also be provided. Preferably the projection screen is substantially blank so that it is substantially free of printing or other markings that noticeably detract from images projected on the screen in the unrolled configuration. In some embodiments, the substantially blank screen is provided with black borders that frame the screen.

With continued reference to FIG. 1, housing 102 generally includes a first housing portion 106, also referred to as a rear housing portion, a second housing portion 108, also referred to as a front housing portion or fascia, a third housing portion 110, also referred to as a first sidewall, and a fourth housing portion 112, also referred to as a second sidewall. First housing portion 106 may include one or more apertures 114 that receive power cables (not shown). Housing 102 includes a longitudinal axis 114 that extends between third housing portion 110 and fourth housing portion 112. As illustrated, longitudinal axis 114 may be substantially perpendicular (that is, perpendicular±5 degrees) to a viewing direction 116 of the projection screen.

Figure 2:
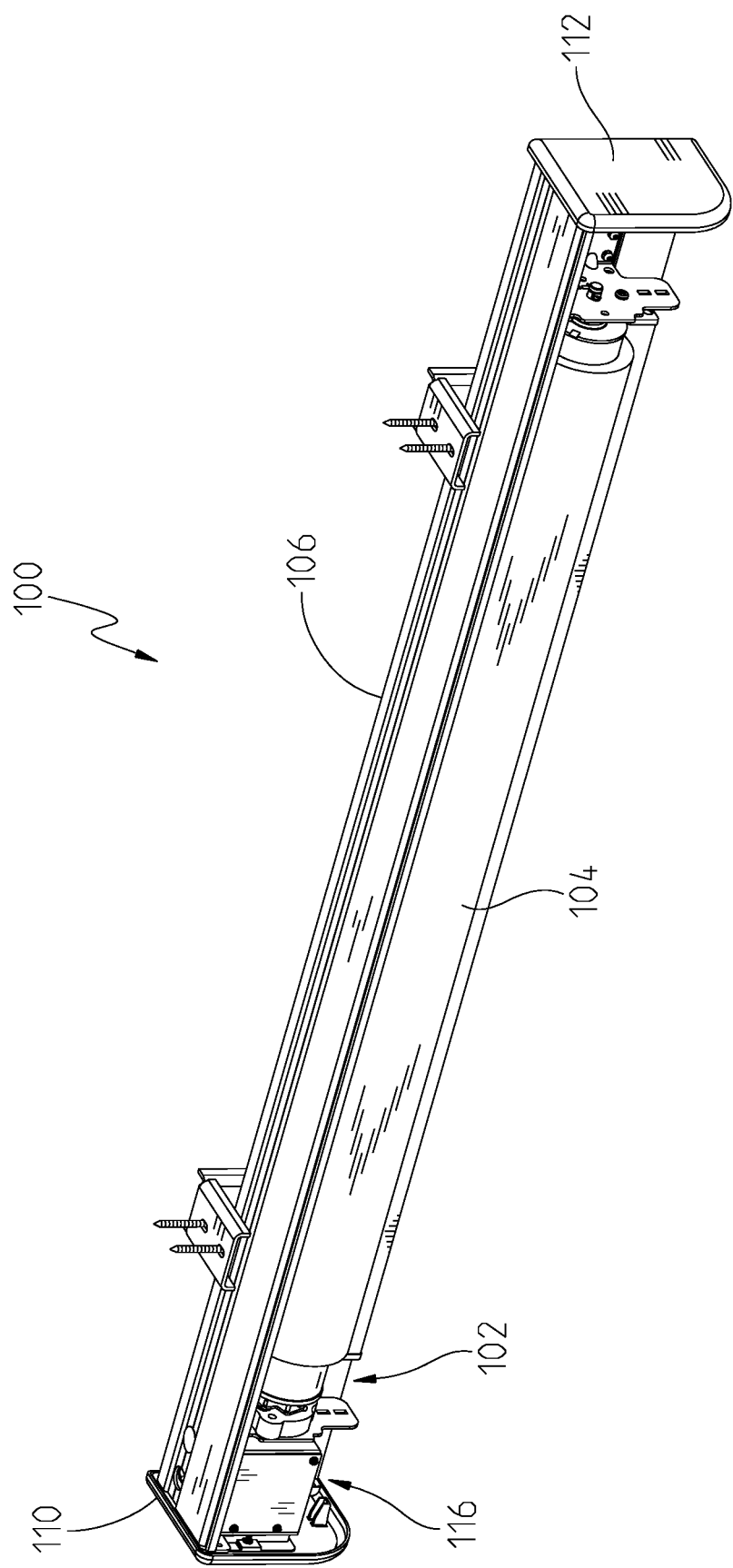
FIG. 2 illustrates another front perspective view of the support system of FIG. 1, where a housing fascia is omitted to illustrate the rollable material in a rolled configuration and a drive mechanism for moving the rollable material.

FIG. 2 illustrates support system 100 with second housing portion 108 omitted to illustrate components carried in housing 102. More specifically, FIG. 2 illustrates rollable material 104 in the rolled configuration and a drive mechanism 116 for moving rollable material 104 from the rolled configuration to the unrolled configuration and vice versa. Drive mechanism 116 may take any of various forms known to those of ordinary skill in the art. Illustratively, drive mechanism 116 and rollable material 104 are supported by first housing portion 106. In other embodiments, drive mechanism 116 and rollable material 104 may be supported by second housing portion 108 (shown elsewhere), third housing portion 110, and/or fourth housing portion 112.

Figure 3:
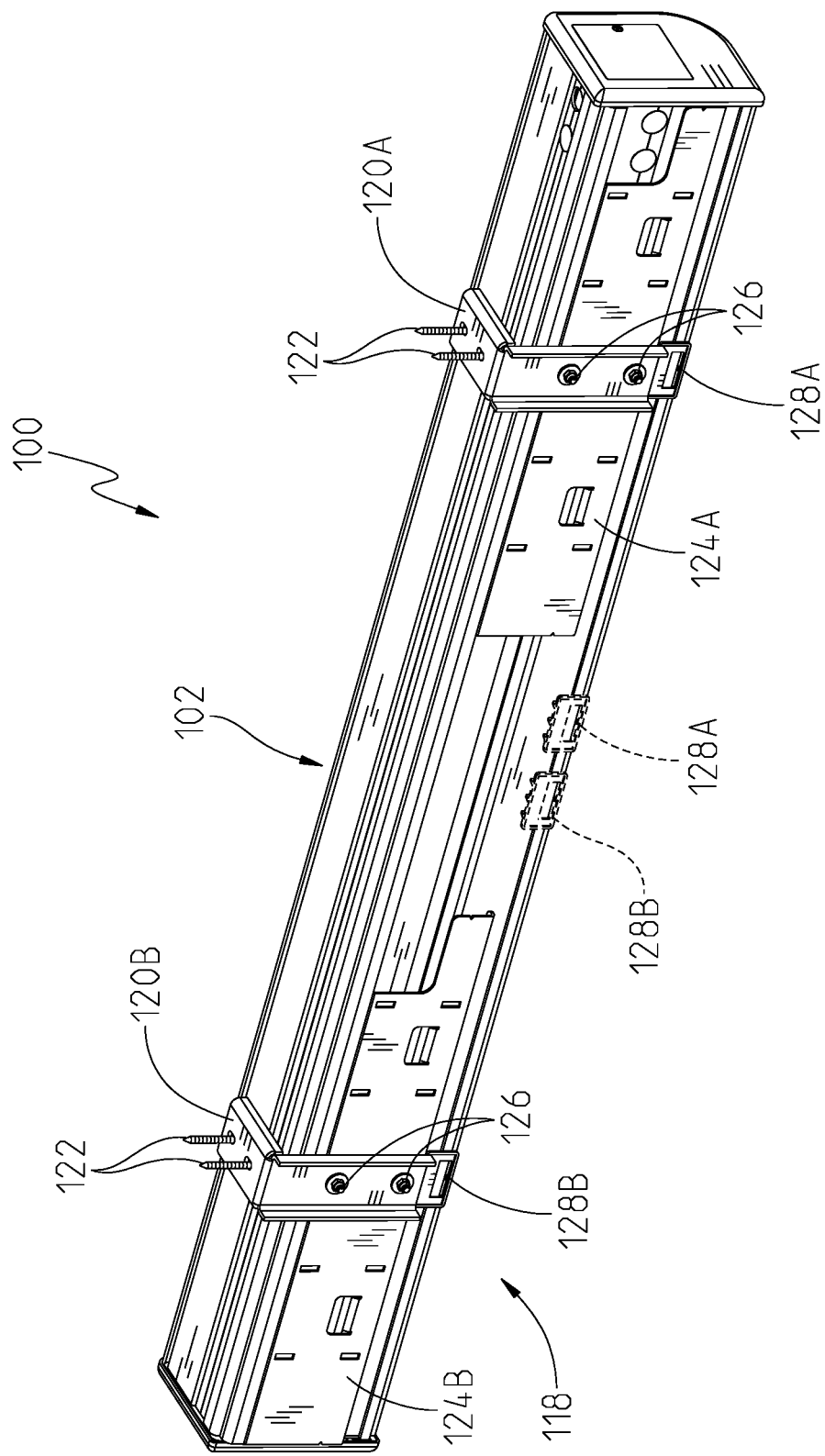
FIG. 3 illustrates a rear perspective view of the support system of FIG. 1, where blockers in locked or engagement positions are shown in solid lines and blockers shown unlocked or disengagement positions are shown in phantom lines.

FIG. 3 illustrates support system 100, and more specifically, a mount 118 that couples housing 102 to environmental support structure S (shown elsewhere). Illustratively, mount 118 includes one or more end mount portions, also referred to as ceiling mount portions, more specifically, a first end mount portion 120A and a second end mount portion 120B, that couple to support structure S (shown elsewhere) via fasteners 122. The mount 118 further includes one or more intermediate mount portions, also referred to as wall mount portions, more specifically, a first intermediate mount portion 124A and a second intermediate mount portion 124B. Each end mount portion couples to one of the intermediate mount portions, for example, via fasteners 126. Each intermediate mount portion supports housing 102, as described in further detail below.

In other embodiments, mount 118 may take different forms. For example, the end mount portions may be omitted, and the intermediate mount portions may couple to an environmental support structure, such as a wall (not shown), via fasteners 126. As another example, the end mount portions and the intermediate mount portions may be monolithically formed with each other. As yet another example, mount 118 may include a different number of sets of the end mount portions and the intermediate mount portions. More specifically, mount 118 may include one set of end and intermediate mount portions, or three or more sets of end and intermediate mount portions.

With continued reference to FIG. 3, housing 102 carries one or more blockers, also referred to as sliders or sliding locks, more specifically, a first blocker 128A and a second blocker 128B. Generally, each blocker is slidable from a disengagement position (shown with phantom lines), or a non-engagement position, to an engagement position (shown with solid lines). In the disengagement position, each blocker is disposed apart from mount 118 and permits attachment and detachment of housing 102 from mount 118. In the engagement position, each blocker is disposed adjacent mount 118 and inhibits detachment of housing 102 from mount 118. More specifically, first blocker 128A is movable from a first disengagement position to a first engagement position. In the first disengagement position, first blocker 128A is a first, larger distance from first intermediate mount portion 124A and permits attachment and detachment of housing 102 from first intermediate mount portion 124A. In the first engagement position, first blocker 128A is a second, smaller distance from first intermediate mount portion 124A and inhibits detachment of housing 102 from first intermediate mount portion 124A. Similarly, second blocker 128B is movable from a second disengagement position to a second engagement position. In the second disengagement position, second blocker 128B is a first, larger distance from second intermediate mount portion 124B and permits attachment and detachment of housing 102 from second intermediate mount portion 124B. In the second engagement position, second blocker 128B is a second, smaller distance from second intermediate mount portion 124B and inhibits detachment of housing 102 from second intermediate mount portion 124B.

Figure 4:
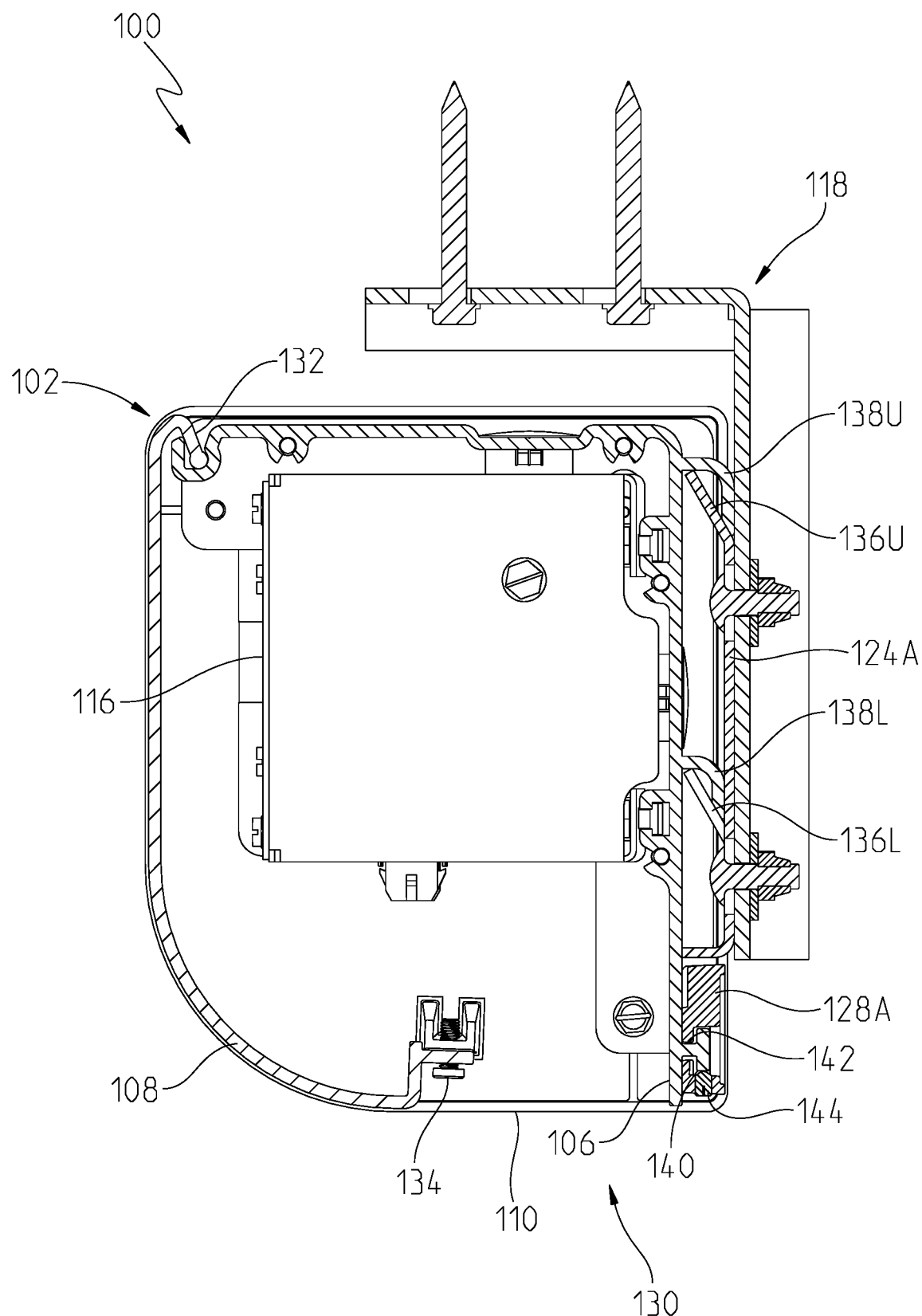
FIG. 4 illustrates a sectional view of the support system along line 4-4 of FIG. 1.
Figure 5:
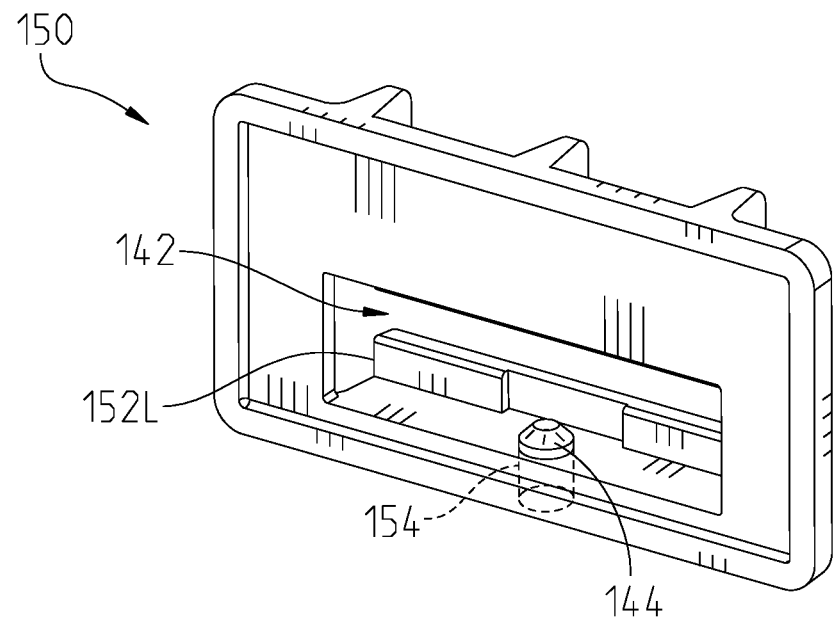
FIG. 5 illustrates a rear perspective view of a representative blocker of the support system FIG. 1.
Figure 6:
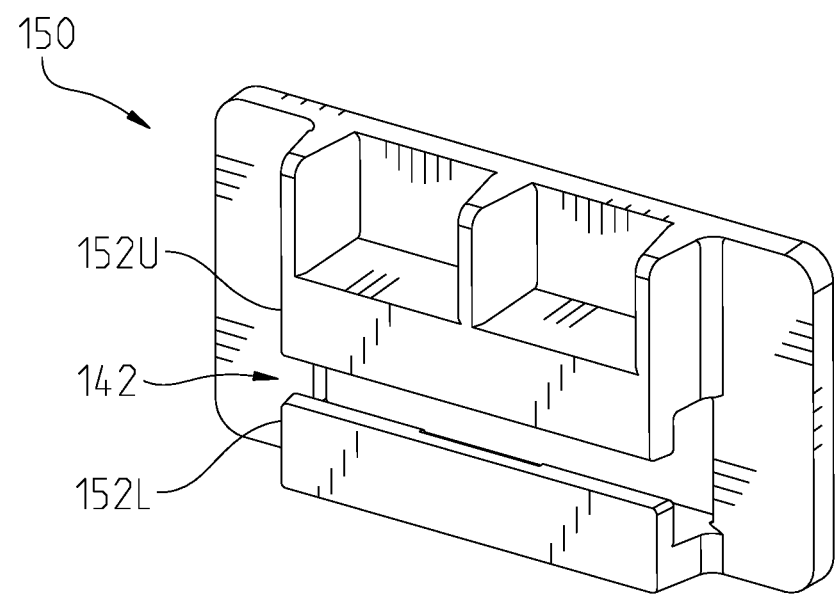
FIG. 6 illustrates a front perspective view of the blocker of FIG. 5.

FIG. 4 illustrates further details of support system 100, more specifically further details of housing 102 and mount 118. As illustrated, first housing portion 106 and second housing portion 108 together define a dispensing passage 130 through which rollable material 104 (shown elsewhere) extends in the unrolled configuration. Second housing portion 108 is movably and detachably coupled to the first housing portion 106 (illustratively, via a detachment hinge 132) to facilitate accessing rollable material 104 (shown elsewhere) and drive mechanism 116. Second housing portion 108 also detachably couples to third housing portion 110 (illustratively, via a fastener 134) and fourth housing portion 112 (shown elsewhere; for example via a fastener—not shown).

With continued reference to FIG. 4, housing 102 and mount 118 include couplers to facilitate mounting housing 102, and accordingly drive mechanism 116 and rollable material 104 (shown elsewhere), to mount 118. Specifically, the intermediate mount portions include one or more ridges that receive one or more catches of first housing portion 106. Illustratively, intermediate mount portion 124A includes an upper ridge 136U and one or more lower ridges 136L that receive an upper catch 138U and a lower catch 138L, respectively, of first housing portion 106. Intermediate mount portion 124B (shown elsewhere) similarly includes an upper ridge and a lower ridge that receive upper catch 138U and lower catch 138L, respectively, of first housing portion 106.

With further reference to FIG. 4, housing 102 and blockers include features to facilitate sliding blockers relative to housing 102, and thereby moving blockers from disengagement positions to engagement positions and vice versa. Specifically, first housing portion 106 includes a coupler 140 that couples to an interface 142 of the blockers, illustratively first blocker 128A. Illustratively, coupler 140 is a guide or rail and interface 142 is a slot that slidably receives the guide. Illustratively, the guide and the slot have horizontally disposed T-shapes. Although interface 142 is shown as a slot, interface 142 may include other types of openings and/or one or more protrusions to cooperate with corresponding features of coupler 140 to couple blockers to housing 102. Second blocker 128B (shown elsewhere) similarly includes an interface, such as a T-shaped slot, that receives coupler 140 of first housing portion 106. The blockers each carry a securement element 144, illustratively, a fastener such as a set screw, that selectively abuts coupler 140 to selectively secure the blockers to first housing portion 106.

FIGS. 5-9 illustrate a representative blocker 150. First blocker 128A (shown elsewhere) and second blocker 128B (shown elsewhere) may include the same or similar features to blocker 150. As illustrated, blocker 150 is a monolithic component that includes opposed upper and lower legs 152U and 152L, and upper leg 152U and lower leg 152L define interface 142, more specifically the slot, therebetween. Blocker 150 further includes a through aperture 154 that carries securement element 144. In other embodiments, blocker 150 may take different forms. For example, blocker 150 may be non-monolithic, or formed from two or more components that coupled to each other. As another example and as described above, interface 142 may include other types of openings and/or one or more protrusions to cooperate with corresponding features of coupler 140 of first housing portion 106 (shown elsewhere).

FIGS. 10-15 illustrate a method for mounting support system 100 to environmental support structure S. The method begins as shown in FIG. 10 by coupling mount 118 to environmental support structure S. Such an action may include coupling first intermediate mount portion 124A to first end mount portion 120A via fasteners 126, coupling first end mount portion 120A to support structure S via fasteners 122, coupling second intermediate mount portion 124B to second end mount portion 120B via fasteners 126, and coupling second end mount portion 120B to support structure S via fasteners 122. Alternatively, if support structure S is a wall instead of a ceiling, this action may include coupling first intermediate mount portion 124A and second intermediate mount portion 124B to support structure S via fasteners 126.

Figure 11:
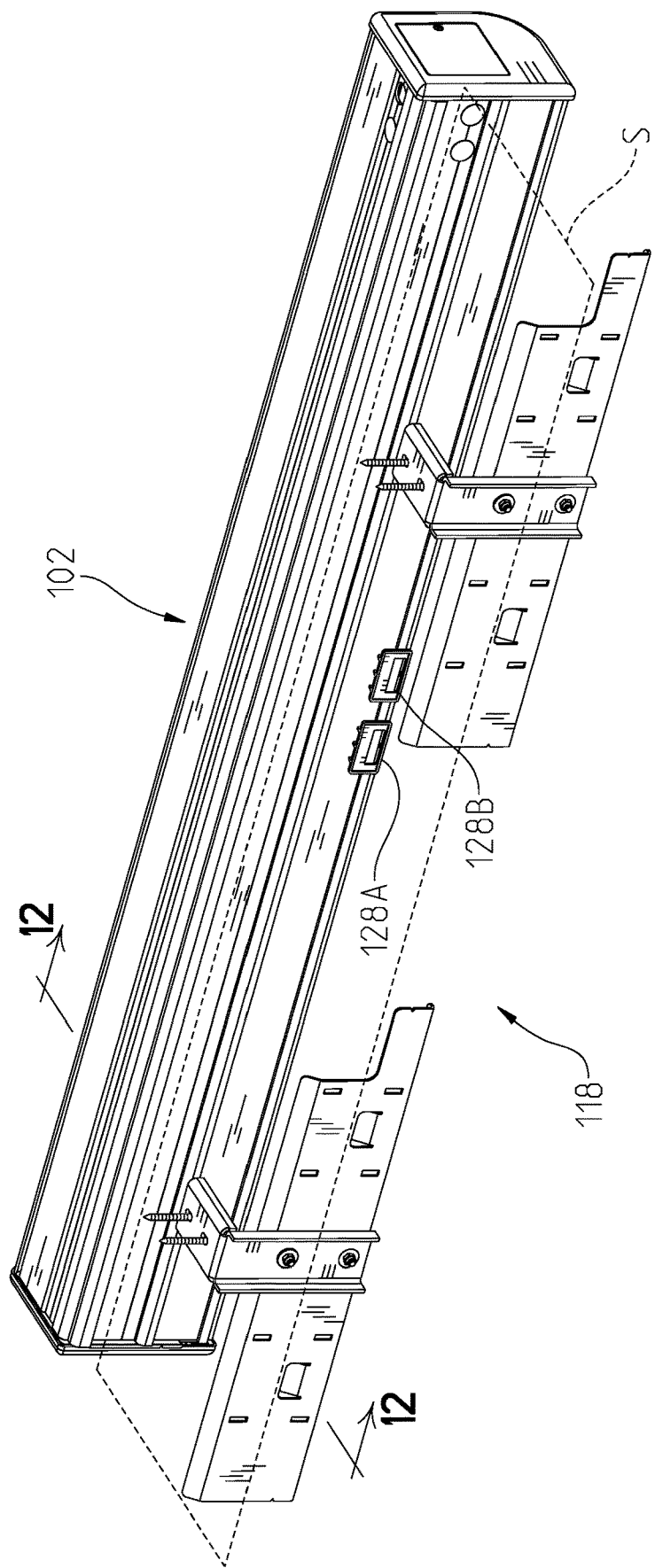
FIG. 11 illustrates a rear perspective view of a housing of the support system of FIG. 1 being positioned adjacent the mount, where blockers are disposed in disengagement positions.
Figure 12:
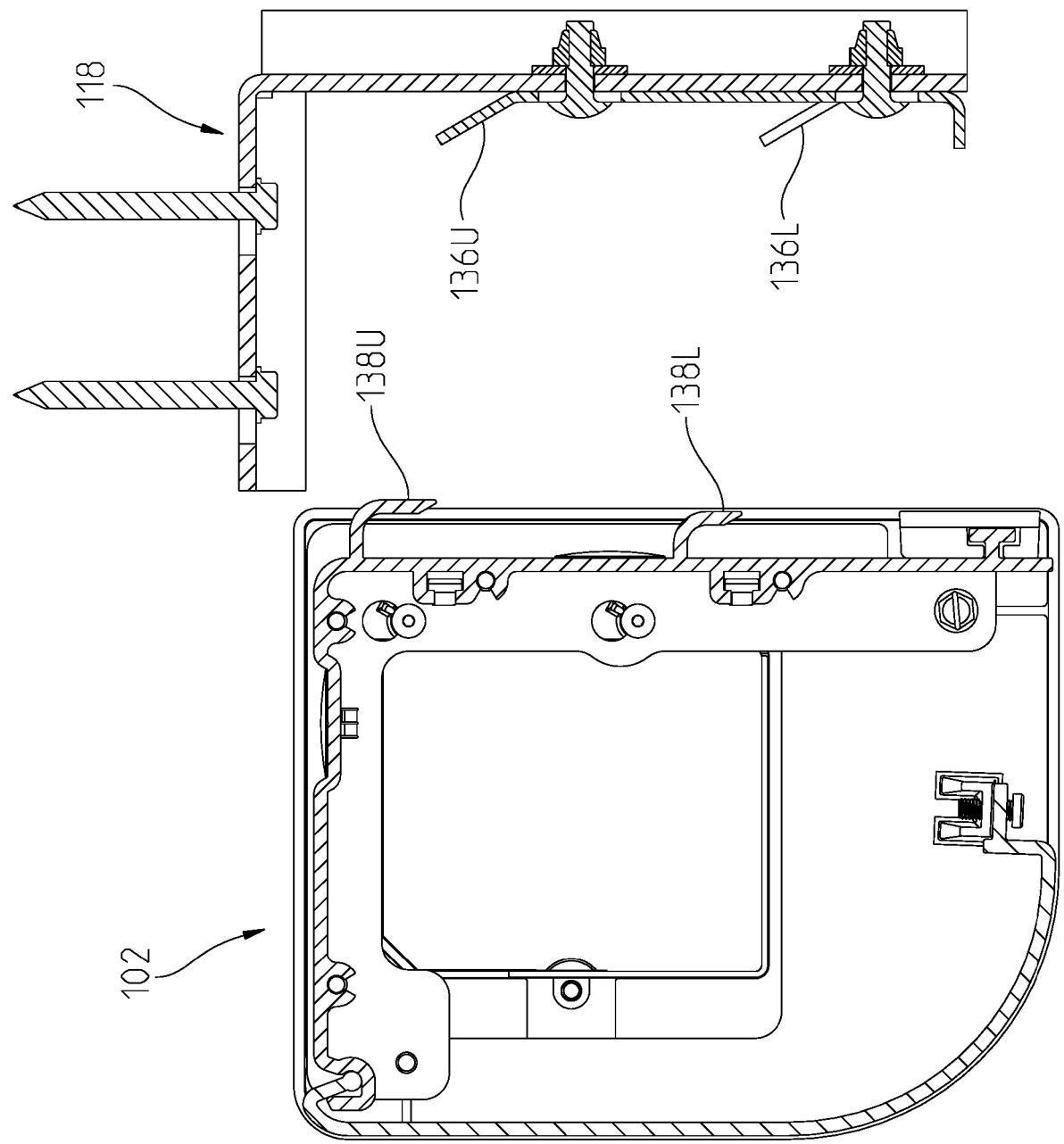
FIG. 12 illustrates a sectional view of the housing being positioned adjacent the mount along line 12-12 of FIG. 11.

The method continues as shown in FIGS. 11 and 12 by positioning housing 102, and accordingly drive mechanism 116 and rollable material 104 (both shown elsewhere), adjacent mount 118. More specifically and as shown in FIG. 12, housing 102 is positioned such that upper catch 138U and lower catch 138L are higher than upper ridges 136U and lower ridges 136L of mount 118, respectively. In addition and as shown in FIG. 11, first blocker 128A and second blocker 128B are disposed in the first disengagement position and the second disengagement position, respectively.

Figure 13:
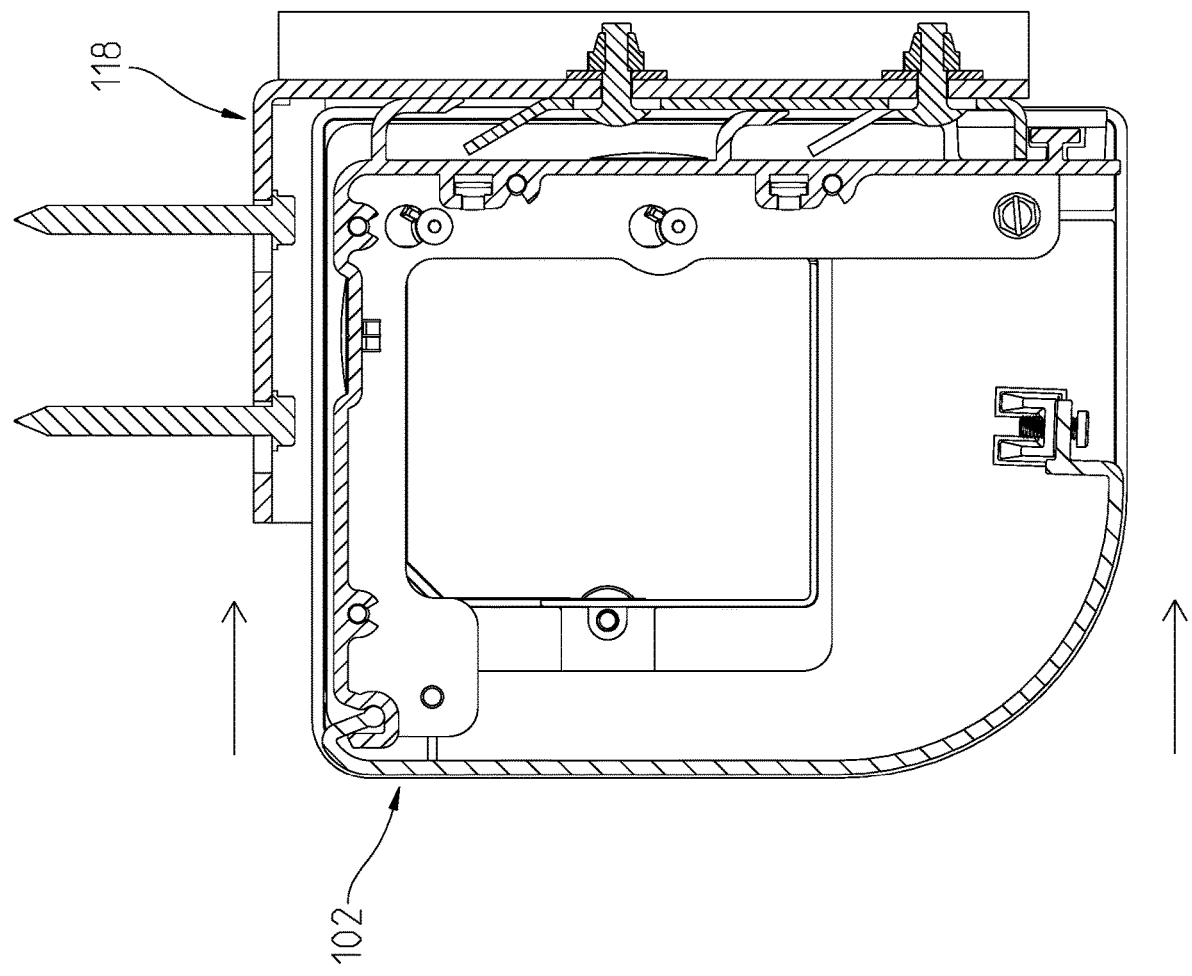
FIG. 13 illustrates a sectional view, similar to FIG. 12, of the housing being moved toward the mount.
Figure 14:
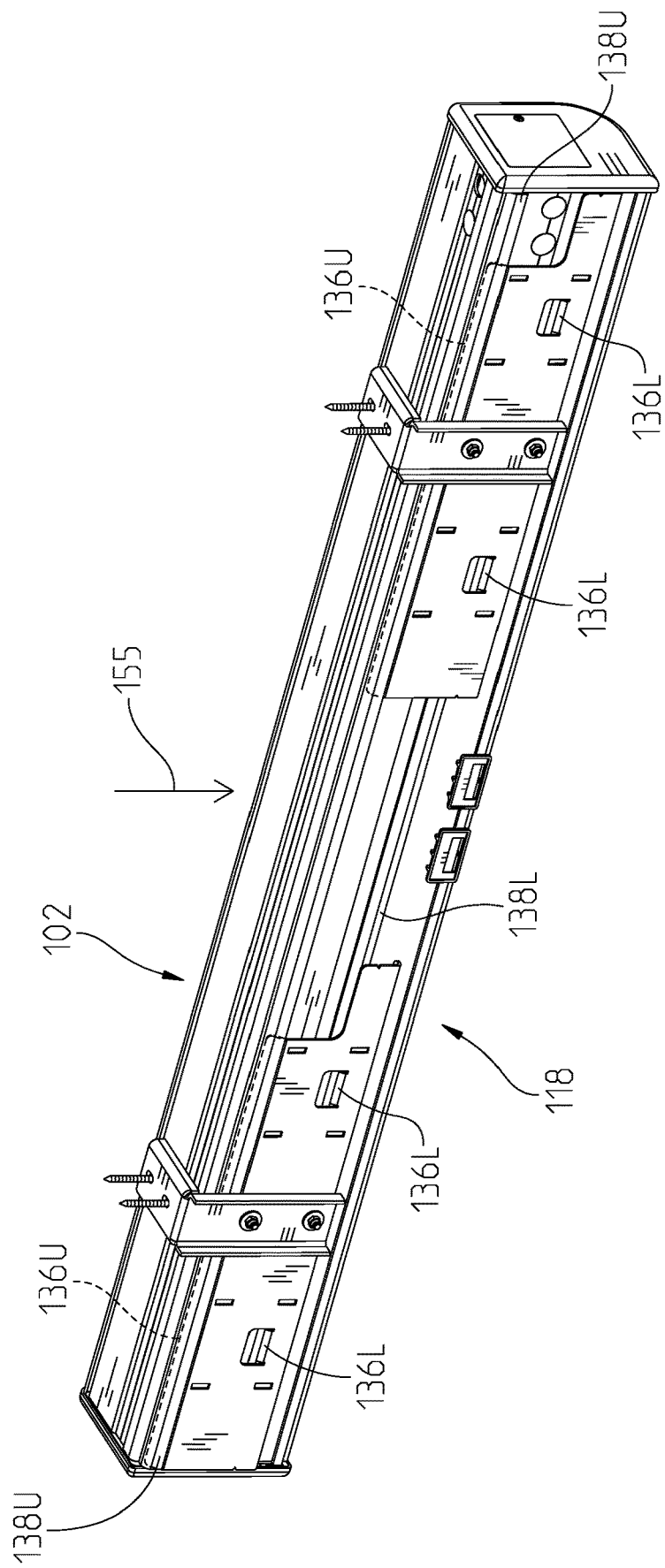
FIG. 14 illustrates a rear perspective view of the housing being mounted on the mount.

The method continues by coupling housing 102 to mount 118. Such an action may include, as shown in FIG. 13, moving housing 102 toward mount 118 and, as shown in FIG. 14, lowering housing 102 in an attachment direction 155 and onto mount 118. As a result, this causes upper catch 138U and lower catch 138L of housing 102 to be received by upper ridges 136U and lower ridges 136L of mount 118, respectively. Illustratively, attachment direction 155 is substantially perpendicular to longitudinal axis 114 and/or viewing direction 116 (both shown elsewhere).

Figure 15:
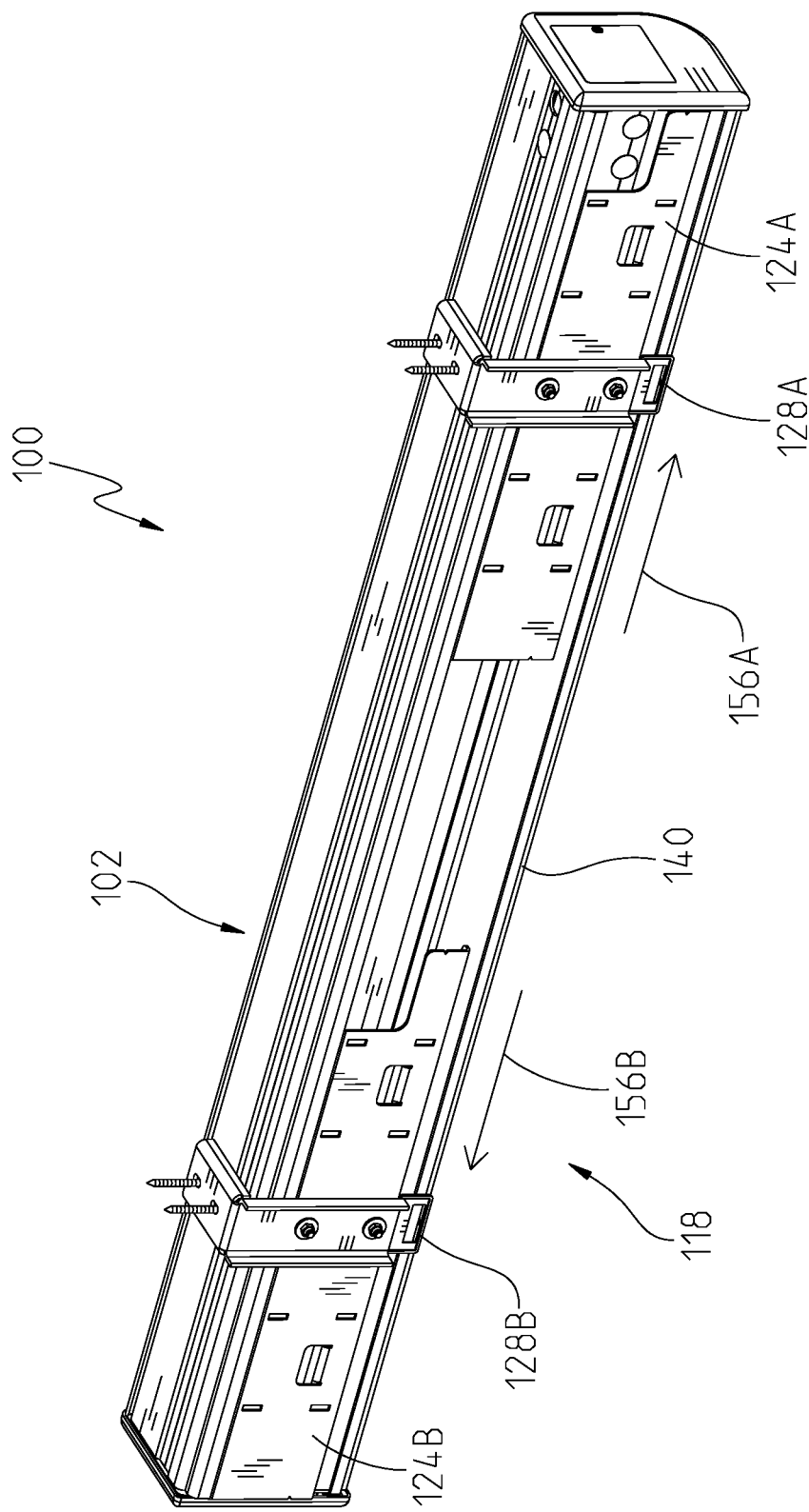
FIG. 15 illustrates the housing mounted on the mount and blockers being moved to engagement positions.

The method continues as shown in FIG. 15 by moving the blockers from the disengagement positions to the engagement positions. More specifically, first blocker 128A is moved from the first disengagement position to the first engagement position, and second blocker 128B is moved from the second disengagement position to the second engagement position. The blockers may be slid along coupler 140, illustratively the guide, of housing 102 from the disengagement positions to the engagement positions. More specifically, first blocker 128A may be slid along coupler 140 in a first sliding direction 156A substantially parallel (that is, parallel±5 degrees) to longitudinal axis 114 (shown elsewhere), and second blocker 128B may be slid along coupler 140 in an opposite second sliding direction 156B substantially parallel to longitudinal axis 114. In the engagement positions, the blockers inhibit detachment of housing 102 from mount 118. More specifically, the blockers contact mount 118 upon application of force opposite attachment direction 155 (shown elsewhere; more specifically, an upward force) that could otherwise cause housing 102 to detach from mount 118. First blocker 128A inhibits detachment of housing 102 from first intermediate mount portion 124A and second blocker 128B inhibits detachment of housing 102 from second intermediate mount portion 124B.

The method continues by securing the blockers to housing 102 via securement elements 144 (shown elsewhere) and connecting support system 100 to a power supply (not shown) via the power cables (not shown). Generally, the above method may be reversed to detach support system 100 from support structure S.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

Furthermore, the connecting lines shown in the various figures contained herein are intended to represent exemplary functional relationships and/or physical couplings between the various elements. It should be noted that many alternative or additional functional relationships or physical connections may be present in a practical system. Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A support system for a rollable material moveable between a rolled configuration and an unrolled configuration, the support system comprising:
    a mount adapted to be supported by an environmental support structure;
    a housing adapted to be supported by the mount, the housing adapted to support the rollable material and including a dispensing passage through which the rollable material is extendable in the unrolled configuration;
    a blocker adapted to be carried by the housing, the blocker adapted to be moved relative to the housing from a disengagement position to an engagement position, in the disengagement position the blocker being adapted to permit detachment of the housing from the mount, and in the engagement position the blocker being adapted to inhibit detachment of the housing from the mount; and
    a securement element adapted to secure the blocker to the housing.

2. The support system of claim 1, wherein in the disengagement position the blocker is adapted to be disposed a first distance from the mount, and in the engagement position the blocker is adapted to be disposed a second distance from the mount, the second distance being less than the first distance.

3. The support system of claim 1, wherein the housing comprises a coupler, and the blocker comprises an interface adapted to couple to the coupler.

4. The support system of claim 3, wherein the coupler comprises a guide and the blocker is slidably carried by the guide.

5. The support system of claim 1, wherein the blocker is a first blocker, the disengagement position is a first disengagement position, the engagement position is a first engagement position, and further comprising:
    a second blocker adapted to be carried by the housing, the second blocker adapted to be moved relative to the housing from a second disengagement position to a second engagement position, in the second disengagement position the second blocker being adapted to permit detachment of the housing from the mount, and in the second engagement position the second blocker being adapted to inhibit detachment of the housing from the mount.

6. The support system of claim 5, wherein the mount comprises:
    a first mount portion adapted to be supported by the environmental support structure; and
    a second mount portion adapted to be supported by the environmental support structure;
    wherein (A) when the first blocker is disposed in the first disengagement position and the second blocker is disposed in the second disengagement position, detachment of the housing from the mount is permitted; and (B) when at least one of the first blocker is disposed in the first engagement position and the second blocker is disposed in the second engagement position, detachment of the housing from the mount is inhibited.

7. The support system of claim 5, wherein the housing comprises a guide adapted to slidably carry the first blocker and the second blocker.

8. The support system of claim 1, wherein the securement element is a fastener.

9. The support system of claim 1, wherein the housing comprises a rail and the blocker comprises a slot adapted to receive the rail and thereby slidably couple the blocker to the housing.

10. The support system of claim 1, wherein the rollable material is a projection screen.

11. A support system for a rollable material moveable between a rolled configuration and an unrolled configuration, the support system comprising:
    a mount adapted to be supported an environmental support structure;
    a housing adapted to support the rollable material, the housing comprising:
        a first housing portion adapted to be supported by the mount;
        a second housing portion adapted to be supported by the first housing portion, the second housing portion and the first housing portion being adapted to together define a dispensing passage through which the rollable material is extendable in the unrolled configuration, and the second housing portion adapted to be moved relative to the first housing portion to provide access to the rollable material;
    a slider adapted to be carried by the housing, the slider adapted to be slid relative to the housing from a disengagement position to an engagement position, in the disengagement position the slider being adapted to permit detachment of the housing from the mount, and in the engagement position the slider being adapted to inhibit detachment of the housing from the mount; and
    a securement element adapted to secure the slider to the housing.

12. The support system of claim 11, wherein in the disengagement position the slider is adapted to be disposed a first distance from the mount, and in the engagement position the slider is adapted to be disposed a second distance from the mount, the second distance being less than the first distance.

13. The support system of claim 11, wherein the slider is a first slider, the disengagement position is a first disengagement position, the engagement position is a first engagement position, and further comprising a second slider adapted to be carried by the housing, the second slider adapted to be slid relative to the housing from a second disengagement position to a second engagement position, in the second disengagement position the second slider being adapted to permit detachment of the housing from the mount, and in the second engagement position the second slider being adapted to inhibit detachment of the housing from the mount.

14. A method for mounting a support system to an environmental support structure via a mount, comprising the steps of:

positioning a housing of the support system adjacent the mount, the housing carrying a blocker movable from a disengagement position to an engagement position;

coupling the housing to the mount while the blocker is in the disengagement position;

moving the blocker from the disengagement position to the engagement position, the blocker thereby inhibiting detachment of the housing from the mount; and securing the blocker to the housing in the engagement position with a securement element.

15. The method of claim 14, wherein in the disengagement position the blocker is disposed a first distance from the mount, and in the engagement position the blocker is disposed a second distance from the mount, the second distance being less than the first distance.

16. The method of claim 14, wherein moving the blocker from the disengagement position to the engagement position comprises sliding the blocker relative to the housing from the disengagement position to the engagement position.

17. The method of claim 16, wherein sliding the blocker from the disengagement position to the engagement position comprises sliding the blocker in a sliding direction substantially parallel to a longitudinal axis of the housing.

18. The method of claim 17, wherein coupling the housing to the mount comprises moving the housing relative to the mount in an attachment direction substantially perpendicular to the longitudinal axis.

19. The method of claim 14, wherein the blocker is a first blocker, the first disengagement position is a first disengagement position, the engagement position is a first engagement position, and the housing carries a second blocker movable from a second disengagement position to a second engagement position; and further comprising:

coupling the housing to the mount while the second blocker is in the second disengagement position;

moving the second blocker from the second disengagement position to the second engagement position, the second blocker thereby inhibiting detachment of the housing from the mount.

20. The method of claim 19, wherein the mount comprises a first mount portion and a second mount portion, wherein moving the first blocker from the first disengagement position to the first engagement position comprises moving the first blocker adjacent the first mount portion such that the first blocker inhibits detachment of the housing from the first mount portion, and wherein moving the second blocker from the second disengagement position to the second engagement position comprises moving the second blocker adjacent the second mount portion such that the second blocker inhibits detachment of the housing from the second mount portion.

21. The method of claim 19, wherein the housing comprises a guide slidably carrying the first blocker and the second blocker, wherein moving the first blocker from the first disengagement position to the first engagement position comprises sliding the first blocker along the guide, and wherein moving the second blocker from the second disengagement position to the second engagement position comprises sliding the second blocker along the guide.

22. The method of claim 21, wherein sliding the first blocker from the first disengagement position to the first engagement position comprises sliding the first blocker along the guide in a first sliding direction substantially parallel to a longitudinal axis of the housing, and wherein sliding the second blocker from the second disengagement position to the second engagement position comprises sliding the second blocker along the guide in a second sliding direction substantially parallel to the longitudinal axis and opposite the first sliding direction.

* * * * *